(12) United States Patent
Rhee

(10) Patent No.: US 11,196,802 B2
(45) Date of Patent: Dec. 7, 2021

(54) CONTENTS MANAGEMENT METHOD AND APPARATUS

(71) Applicant: Samsung Electronics Co., Ltd., Suwon-si (KR)

(72) Inventor: Young-ho Rhee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 36 days.

(21) Appl. No.: 16/209,155

(22) Filed: Dec. 4, 2018

(65) Prior Publication Data

US 2019/0109892 A1 Apr. 11, 2019

Related U.S. Application Data

(60) Continuation of application No. 14/275,053, filed on May 12, 2014, now abandoned, which is a (Continued)

(30) Foreign Application Priority Data

Jan. 31, 2007 (KR) .................. 10-2007-0010267

(51) Int. Cl.
*H04L 29/08* (2006.01)
*G06F 16/958* (2019.01)
(Continued)

(52) U.S. Cl.
CPC ............ *H04L 67/10* (2013.01); *G06F 16/958* (2019.01); *H04L 67/325* (2013.01);
(Continued)

(58) Field of Classification Search
CPC ..... H04L 67/10; H04L 67/325; G06F 16/958; H04W 36/305; H04W 36/14;
(Continued)

(56) References Cited

U.S. PATENT DOCUMENTS 5,924,090 A 7/1999 Krellenstein
7,187,658 B2 3/2007 Koyanagi et al.
(Continued)

FOREIGN PATENT DOCUMENTS

JP 2003-150494 A 5/2003
KR 10-2001-0104900 A 11/2001
(Continued)

OTHER PUBLICATIONS

"Alcatel onetouch", "https://www.consumercellular.com/assets/documents/Manuals/Alcatel_Pop_3_LTE_User_Guide.pdf", publicly available on Jul. 10, 2003, (Year: 2003).*
(Continued)

*Primary Examiner* — Thinh D Tran
(74) *Attorney, Agent, or Firm* — Jefferson IP Law, LLP

(57) ABSTRACT

A contents management method and system, the contents management method including: generating contents; and transmitting the generated contents to a Web server, wherein the Web server receives the contents, stores the contents, manages the contents, and maintains a list of the contents so that the contents are easily accessible by a terminal.

16 Claims, 13 Drawing Sheets

Related U.S. Application Data continuation of application No. 12/579,557, filed on Oct. 15, 2009, now abandoned, which is a division of application No. 11/854,157, filed on Sep. 12, 2007, now abandoned.

(51) Int. Cl.
  *H04W 36/36* (2009.01)
  *H04W 36/00* (2009.01)
  *H04W 36/14* (2009.01)
  *H04W 36/30* (2009.01)
  *H04N 1/00* (2006.01)

(52) U.S. Cl.
  CPC .... *H04N 1/00204* (2013.01); *H04W 36/0079* (2018.08); *H04W 36/14* (2013.01); *H04W 36/305* (2018.08); *H04W 36/36* (2013.01)

(58) Field of Classification Search
  CPC . H04W 36/06; H04W 76/20; H04W 36/0011; H04W 36/27; H04W 36/0079; H04W 36/0083; H04W 36/023; H04W 36/36; H04N 1/00204
  See application file for complete search history.

(56) References Cited

U.S. PATENT DOCUMENTS

| | | | |
|---|---|---|---|
| 7,639,943 B1* | 12/2009 | Kalajan | G03B 29/00 396/429 |
| 7,660,831 B2 | 2/2010 | Freedman | |
| 7,769,887 B1 | 8/2010 | Bhattacharyya et al. | |
| 2002/0059176 A1 | 5/2002 | Fujisawa | |
| 2003/0023505 A1 | 1/2003 | Eglen et al. | |
| 2003/0028895 A1 | 2/2003 | Buehler et al. | |
| 2003/0184793 A1 | 10/2003 | Pineau | |
| 2004/0054760 A1 | 3/2004 | Ewing et al. | |
| 2004/0070670 A1 | 4/2004 | Foster | |
| 2005/0240680 A1 | 10/2005 | Costa-Requena et al. | |
| 2005/0278389 A1* | 12/2005 | Maze | G06F 16/1844 |
| 2006/0013197 A1* | 1/2006 | Anderson | H04L 63/08 370/352 |
| 2006/0047830 A1 | 3/2006 | Nair et al. | |
| 2006/0053447 A1 | 3/2006 | Krzyzanowski et al. | |
| 2006/0146767 A1* | 7/2006 | Moganti | H04L 67/30 370/338 |
| 2006/0173976 A1* | 8/2006 | Vincent | H04L 63/08 709/220 |
| 2006/0182045 A1 | 8/2006 | Anderson | |
| 2006/0218482 A1 | 9/2006 | Ralston et al. | |
| 2006/0221190 A1* | 10/2006 | Limberis | G06F 16/4393 348/207.1 |
| 2006/0245728 A1 | 11/2006 | Mukaihara et al. | |
| 2007/0011171 A1* | 1/2007 | Nurminen | H04W 4/029 |
| 2007/0042777 A1* | 2/2007 | Govindarajan | H04W 68/12 455/435.2 |
| 2007/0207755 A1 | 9/2007 | Julia et al. | |
| 2007/0207782 A1* | 9/2007 | Tran | H04L 29/06027 455/414.1 |
| 2007/0218902 A1 | 9/2007 | Smyk et al. | |
| 2008/0056225 A1 | 3/2008 | Brok | |
| 2013/0331084 A1 | 12/2013 | Osborne et al. | |

FOREIGN PATENT DOCUMENTS

| | | |
|---|---|---|
| KR | 10-2002-0036136 A | 5/2002 |
| KR | 10-2002-0086245 A | 11/2002 |
| KR | 10-2005-0068041 A | 7/2005 |
| KR | 10-2005-0098052 A | 10/2005 |
| KR | 10-2006-0004049 A | 1/2006 |
| KR | 10-2006-0099045 A | 9/2006 |
| KR | 10-2006-0128207 A | 12/2006 |

OTHER PUBLICATIONS

AlcatelRaven, "User Manual", made and printed in China, published Jan. 7, 2003 (Year: 2003).*

SyncML Initiative. "Building an Industry-Wide Mobile Data Synchronization Protocol" SyncML White Paper version 1.0 (2000) 14 pages.

SyncML Initiative. "SyncML Sync Protocol, version 1.1" (Feb. 2002) 62 pages.

* cited by examiner

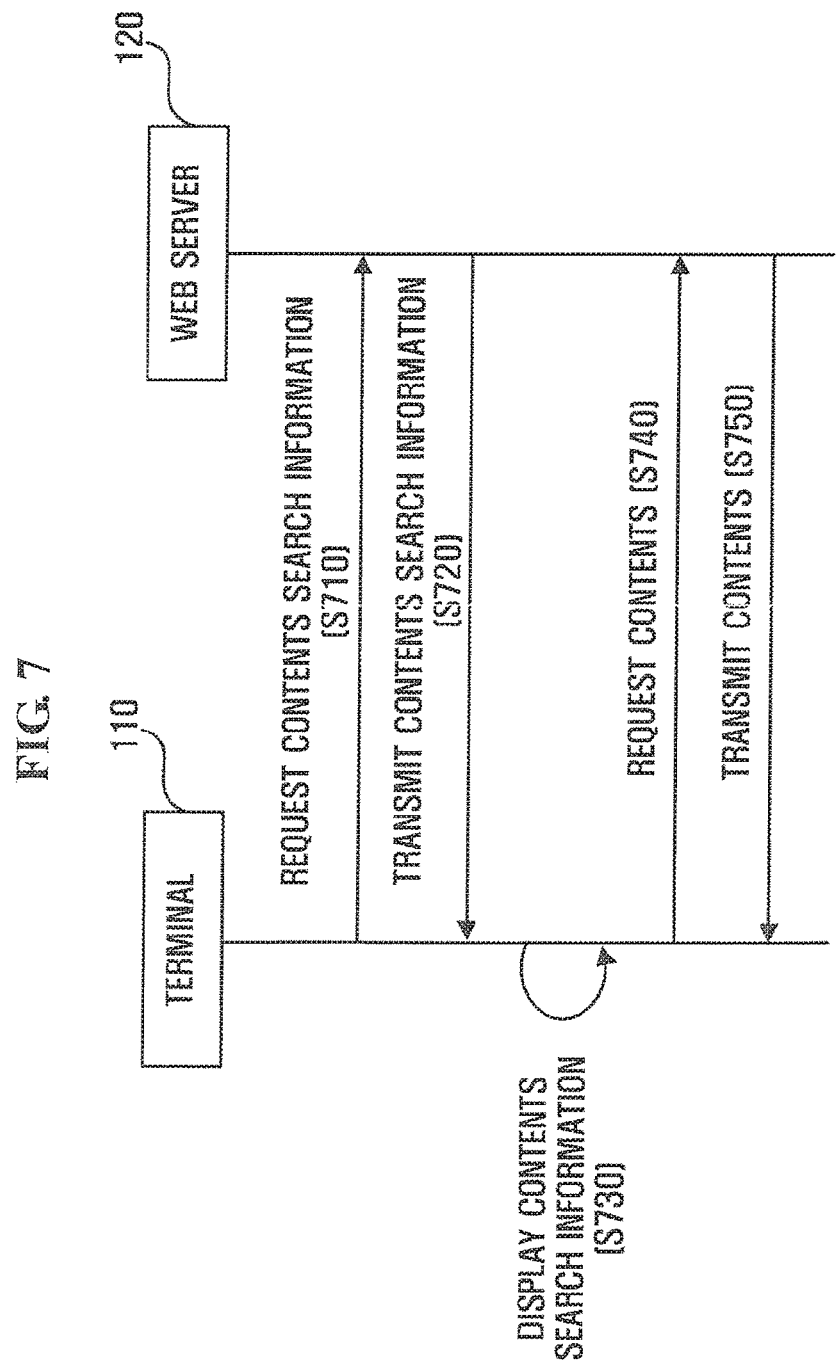

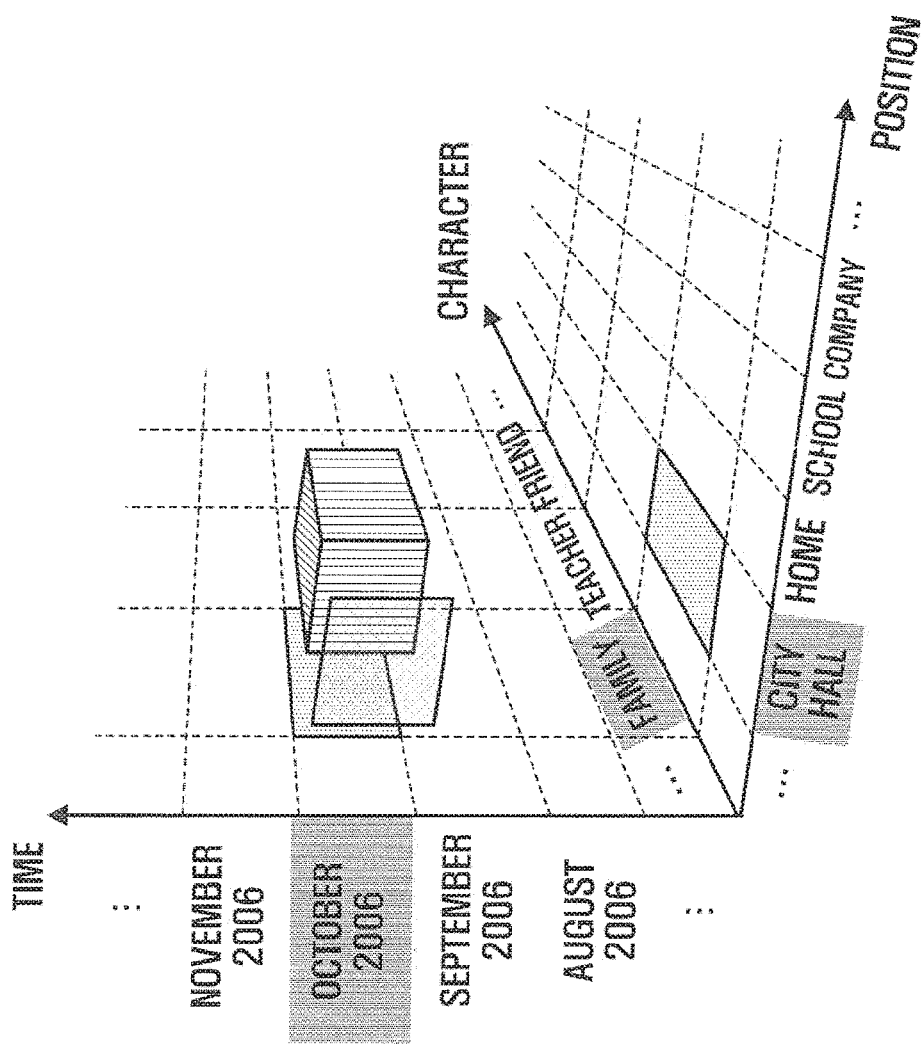

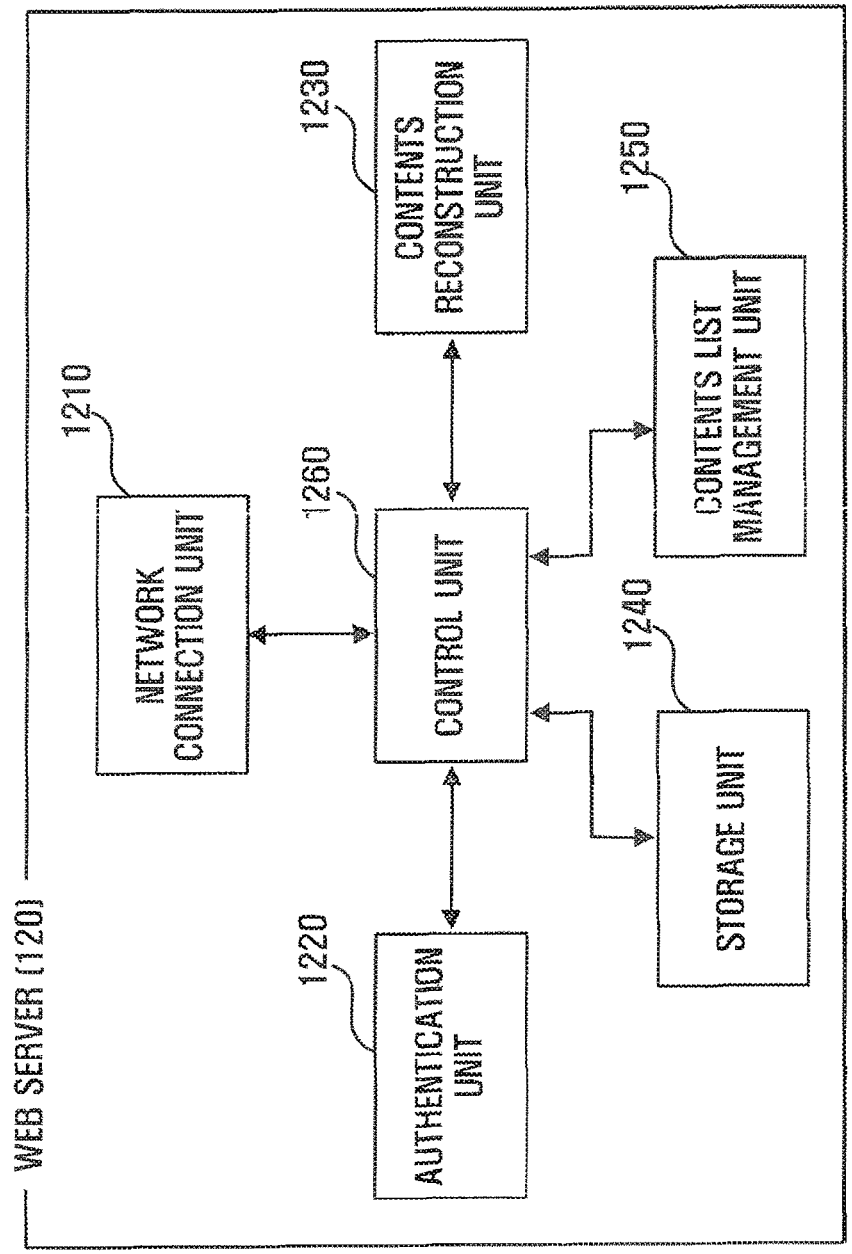

CONTENTS MANAGEMENT METHOD AND APPARATUS

CROSS-REFERENCE TO RELATED APPLICATION(S)

This application is a continuation application of prior application Ser. No. 14/275,053, filed on May 12, 2014, which is a continuation of U.S. patent application Ser. No. 12/579,557, filed on Oct. 15, 2009, which is a divisional of U.S. patent application Ser. No. 11/854,157, filed on Sep. 12, 2007, which was based on and claimed priority of a Korean Patent Application number 10-2007-0010267, filed on Jan. 31, 2007, in the Korean Intellectual Property Office, the disclosure of which is incorporated by reference herein in its entirety.

BACKGROUND OF THE INVENTION

1. Field of the Invention

Aspects of the present invention relate to a contents management method and apparatus, and more particularly, to a terminal that generates contents, a Web server that reconstructs contents to be transmitted from a terminal, and a contents management method between a terminal and a Web server.

2. Description of the Related Art

With the development of digital technologies, the demand for various kinds of digital contents (hereinafter, referred to as "contents"), such as music, movies, photographs, and documents, is increasing. Since users want to constantly use the contents regardless of location, portable digital terminals (such as PDAs, cellular phones, MP3 players, and PMPs) are widely used to receive such contents. The portable digital terminals are provided with various kinds of content generating functions so that the users can use existing contents as well as generate new contents.

Under this environment, since the number and kinds of contents and terminals processing the contents are increasing, managing the contents has become more difficult. Furthermore, since the contents may be separately distributed to individual terminals, searching for and obtaining desired contents at a desired time becomes more difficult.

Accordingly, there is a need for a technology to efficiently manage the contents for use at these portable digital terminals.

SUMMARY OF THE INVENTION

Aspects of the present invention provide a method and apparatus that can efficiently manage contents for use by portable digital terminals.

According to an aspect of the present invention, there is provided a contents management method, the contents management method including: generating contents; and transmitting the generated contents to a Web server, wherein the Web server receives the contents, stores the contents, manages the contents, and maintains a contest list of the contents so that the contents are easily accessible by a terminal.

According to another aspect of the present invention, there is provided a contents management method, the contents management method including: receiving contents from a terminal; storing the contents; and managing and classifying the received contents according to attributes of the contents so that the contents are easily accessible by the terminal.

According to still another aspect of the present invention, there is provided a terminal, the terminal including: a contents generation unit to generate contents; and a communication unit to transmit the generated contents to a Web server, wherein the Web server receives the contents, stores the contents, manages the contents, and maintains a contest list of the contents so that the contents are easily accessible by a terminal.

According to yet another aspect of the present invention, there is provided a Web server, the Web server including: a network connection unit to receive contents from a terminal; a storage units to store the received contents; and a contents reconstruction unit to manage and to classify the received contents according to attributes of the contents so that the contents are easily accessible by the terminal.

According to another aspect of the present invention, there is provided a system for managing contents, the system including: a terminal including: a contents generation unit to generate contents, and a communication unit to transmit the generated contents; and a Web server including: a network connection unit to receive the generated contents from the terminal, a storage unit to store the received contents, and a contents reconstruction unit to manage and to classify the received contents in a content list according to attributes of the contents so that the contents are easily accessible by the terminal.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 7 is a diagram showing a method in which a terminal receives contents from a Web server according to an example embodiment of the present invention;

FIG. 8B is a diagram showing contents search information according to an example embodiment of the present invention;

FIG. 12 is a block diagram showing a configuration of a Web server according to an example embodiment of the present invention.

DETAILED DESCRIPTION OF THE EMBODIMENTS

Figure 1:
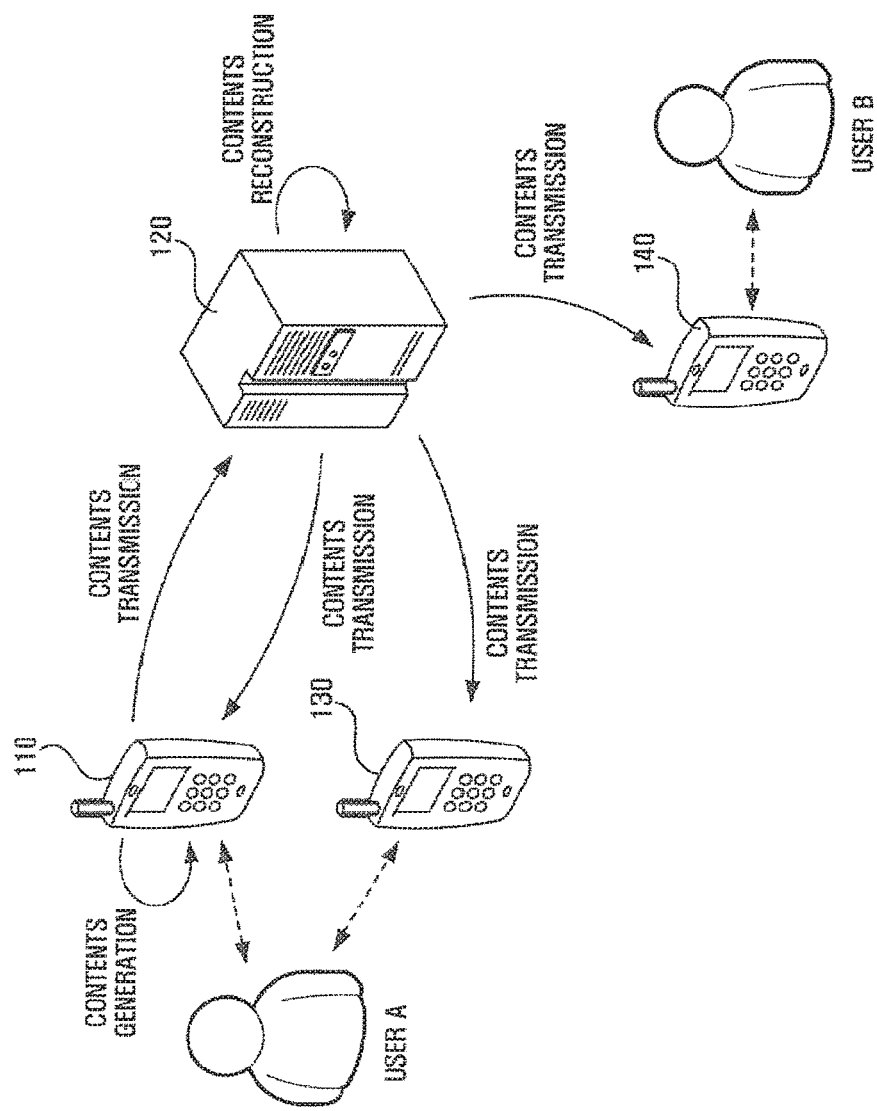
FIG. 1 is a diagram showing a contents management system according to an example embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 is a diagram showing a contents management system 100 according to an example embodiment of the present invention. The contents management system 100 includes a terminal 110 and a Web server 120.

The terminal 110 generates contents. According to aspects of the present invention, the contents represent data objects including at least one of audio data, video data, and text data. For example, the contents may include photographs, music, motion pictures, e-mails, electronic books, schedules, messages, and memos. However, it is understood that the types of the contents are not limited thereto.

The terminal 110 can transmit the generated contents to the Web server 120. According to an aspect of the present invention, the terminal 110 may transmit the contents to the Web server 120 automatically (such as when the contents are generated) without a user manipulation or request.

The terminal 110 may be a portable digital apparatus, such as a cellular phone, a digital camera, a PDA (Personal Digital Assistant), a notebook computer, a PMP (Portable Multimedia Player), or a MP3 player. However, it is understood that aspects of the present invention are not limited thereto. For example, the terminal 110 may also be a fixed digital apparatus, such as a digital TV, a desktop computer, or a set-top box.

The Web server 120 stores the contents transmitted from the terminal 110 and reconstructs the contents according to a predetermined criterion. The reconstruction of the contents classifies and manages the contents so that the user can easily access the contents.

The contents stored in the Web server 120 can be provided to the terminal 110 again. The Web server 120 can also provide the contents to another terminal 130, which belongs to the user (user A) or another user that has a right to access the contents. Furthermore, the user (user A) of the terminal 110 can provide the contents to a terminal 140 of another user (user B). An operation in which the Web server 120 provides the contents to a specified terminal can be performed when the corresponding terminal requests the contents or the operation. However, according to other aspects of the present invention, the operation in which the Web server 120 provides the contents to the specified terminal may be automatically performed even if the corresponding terminal does not request the contents or the operation.

Other terminals 130 and 140 can also generate contents and transmit the generated contents to the Web server 120. That is, the terminal 130 and the terminal 140 can perform the same operation that is performed by the terminal 110. However, for convenience of explanation, in the embodiment, it is assumed that the terminal 110 generates the contents and transmits the generated contents to the Web server 120. Hereinafter, the operations performed by the terminal 110 and the Web server 120 according to aspects of the present invention will be described.

A communication method that is used by the terminal 110 to access the Web server 120 varies according to a communication environment of the terminal 110 and/or the Web server 120. An example is shown in FIG. 2.

Figure 2:
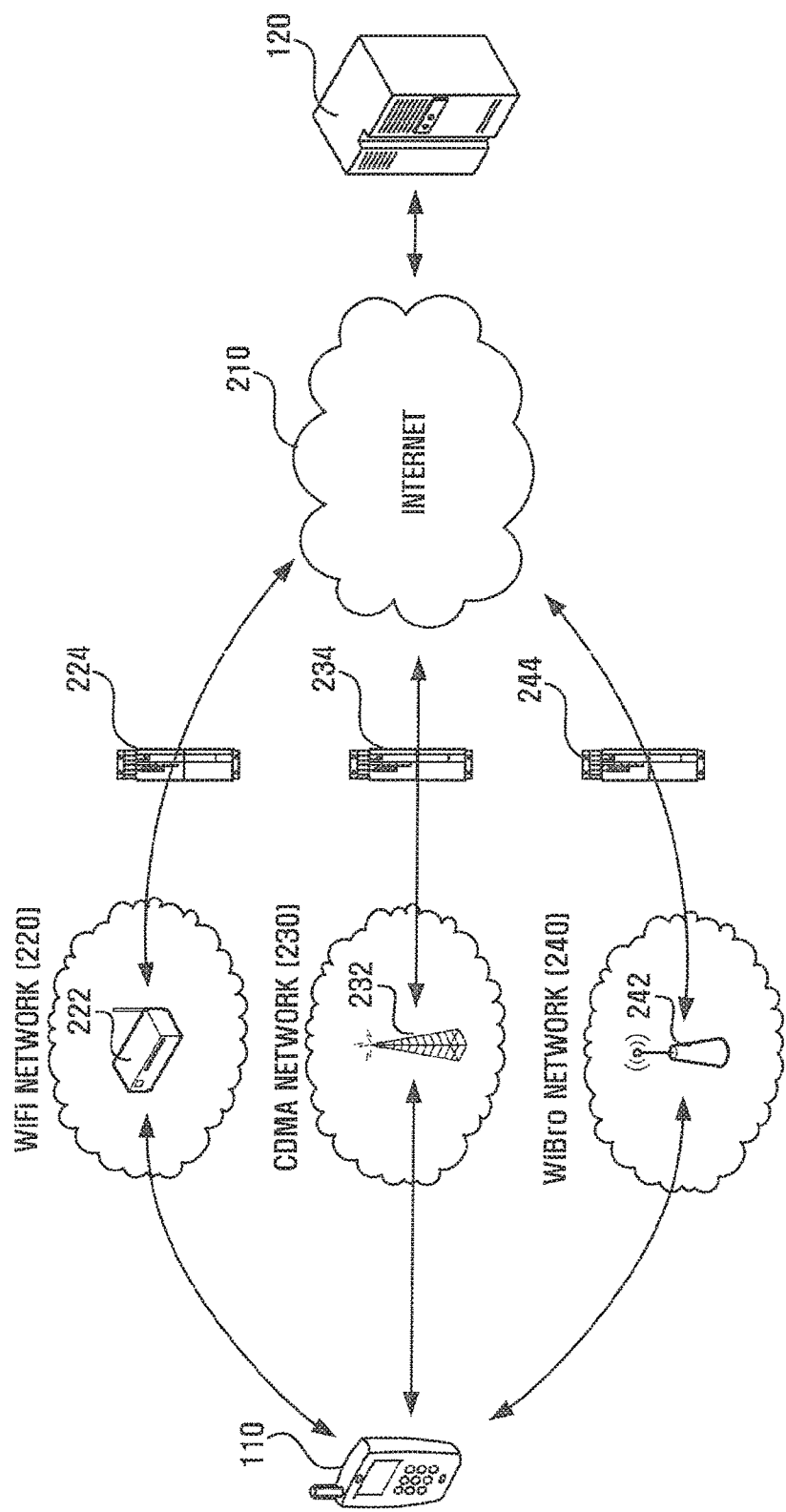
FIG. 2 is a diagram showing a communication environment of a terminal according to an example embodiment of the present invention.

FIG. 2 is a diagram showing a communication environment of a terminal 110 according to an example embodiment of the present invention. In this embodiment, it is assumed that the terminal 110 is connected to the Internet 210 via a network, such as a WiFi network 220, a CDMA network 230, and a WiBro network 240, so as to access the Web server 120.

When the terminal 110 is located at an office or at home, for example, the terminal 110 can connect to the Internet 210 on the basis of WiFi (Wireless Fidelity) network 220. If the terminal 110 is out of a communication range of an access point (AP) 220 at the office or at home, the terminal 110 can be connected to Internet 210 on the basis, for example, of a CDMA (Code Division Multiple Access) network 230. Further, when the terminal 110 is moving at high speed, the terminal 110 can be connected to Internet 210 using, for example, a WiBro (Wireless Broadband Internet) network 240. Specifically, network service providers 224, 234, and 244 that support the connection of individual communication networks 220, 230, and 240 to the Internet 210 can exist, and the terminal 110 can access the Web server 120 through the network service providers 224, 234, and 244.

According to the location of the terminal 110, the terminal 110 may use a plurality of communication methods to access the Web server 120. For example, the terminal 110 can connect to the Internet 210 at home on the basis of both WiFi and CDMA. Accordingly, if a plurality of communication methods can be used to access the Web server 120, the terminal 110 can select one or more communication methods from the plurality of communication methods. The accessing of the Web server 120 by the terminal 110 will now be described with reference to FIG. 3.

Figure 3:
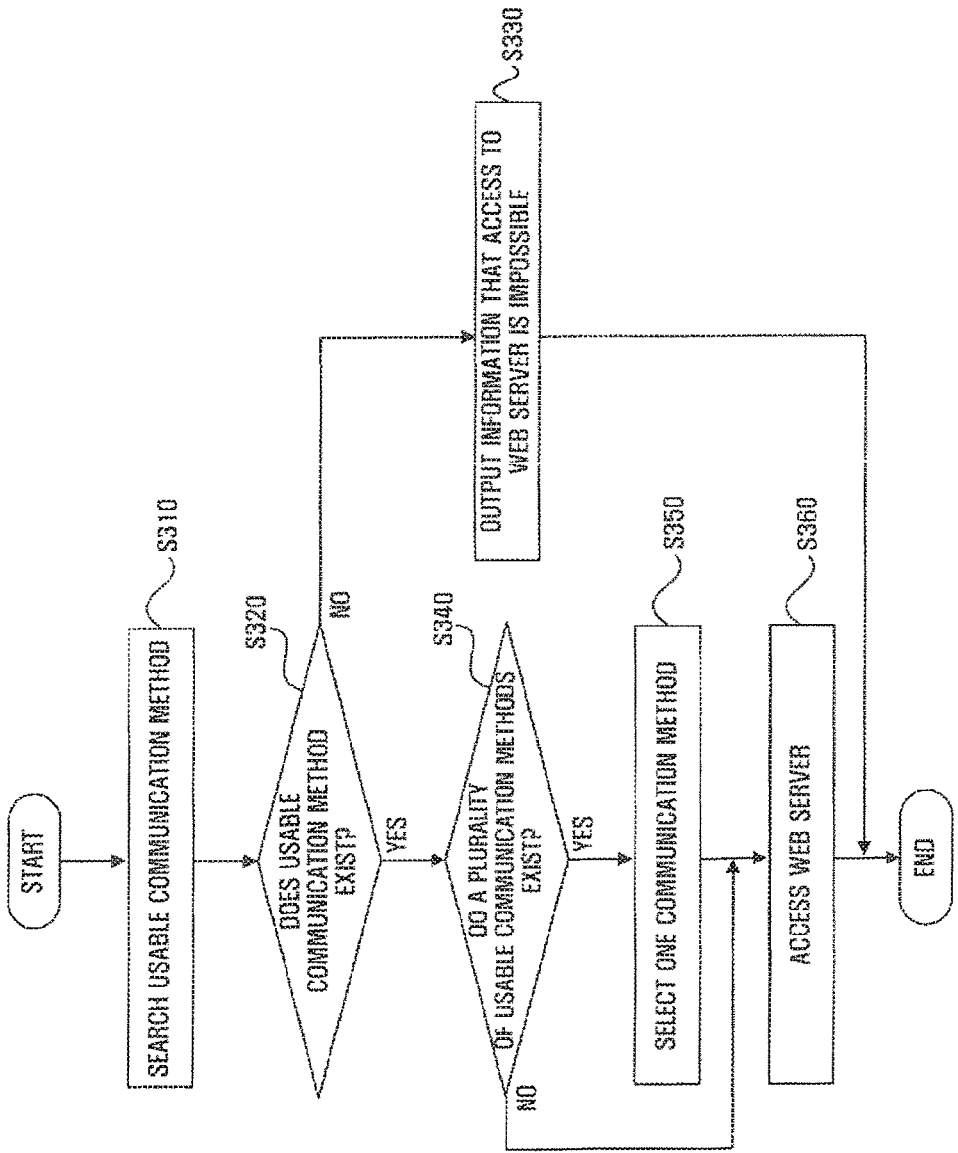
FIG. 3 is a flowchart showing a method in which a terminal accesses a Web server according to an example embodiment of the present invention.

FIG. 3 is a flowchart showing a method in which a terminal 110 accesses a Web server 120 according to an embodiment of the present invention. Referring to FIGS. 2 and 3, when access to the Web server 120 is needed (for example, when the user requests the access or the contents are to be transmitted to the Web server 120, the terminal 110 searches for a currently-usable communication method in operation S310. For example, if an access point 222 that supports WiFi exists in the vicinity of the terminal 110, the terminal 110 receives a beacon cyclically transmitted from the access point (AP) 222 to thereby recognize that WiFi communication is usable. Alternatively, if a base station 232 that supports CDMA communication exists in the vicinity of the terminal 110, the terminal 110 receives a base station signal cyclically transmitted from the base station 232 to thereby recognize that CDMA communication is usable. Similarly, if a base station 242 that supports WiBro communication exists in the vicinity of the terminal 110, the terminal 110 receives a base station signal cyclically transmitted from the base station 242 to thereby recognize that WiBro communication is usable. It is understood that other communication methods may be searched or used.

Next, the terminal 110 determines whether the usable communication method exists in operation S320. If the usable communication method does not exist (operation S320), the terminal 110 informs the user that access to the Web server 120 cannot be performed in operation S330.

Meanwhile, if the usable communication method exists (operation S320), the terminal 110 determines whether a plurality of communication methods exist in operation S340. If a plurality of usable communication methods exist (operation S340), the terminal 110 selects one communication method from the plurality of communication methods according to a prescribed criterion (hereinafter, referred to as a "communication method selection criterion") in operation S350.

A billing policy of the communication method is an example of the communication method selection criterion. In this case, the terminal 110 can use a communication method having the lowest charge rate from the plurality of communication methods. For example, if Internet communication based on WiFi is charged according to a flat rate and Internet communication based on the CDMA is charged according to an hourly rate, in a communication environment where both the WiFi and CDMA are usable, the WiFi that does not require an additional fee is selected according to the communication method selection criterion. It is understood that, according to other aspects, the terminal 110 does not necessarily compare and analyze the fees of the individual communication methods. For example, if a priority is set in advance for the individual communication methods on the basis of respective communication fees, manually, or other characteristics (such as signal strength), the terminal 110 can select a communication method to be used according to the set priority. Here, the priority can be set by the user or a manufacturer of the terminal.

A communication condition is another example of the communication method selection criterion. In this case, the terminal 110 can select a communication method having a lowest traffic from the plurality of usable communication methods or a communication method having a strongest connection intensity to a repeater (for example, the intensity of a signal to be cyclically transmitted from the repeater). Moreover, is it understood that other communication method selection criterions may be used.

Once the communication method is selected (operation S350), the terminal 110 accesses the Web server 120 using the selected communication method in operation S360. Meanwhile, if a single usable communication method exists (operation S340), the terminal 110 can access the Web server 120 using the corresponding communication method in operation S360.

When accessing the Web server 120, the terminal 110 may, although not necessarily, transmit predetermined authentication information to the Web server 120. The authentication information is information to authenticate the user of the terminal 110 and may include, for example, a user ID and a password. It is understood that other or additional information may be used to authenticate the user, such as an identifier of the terminal 110 (for example, an MAC address of the terminal 110). The Web server 120 identifies and authenticates the user of the terminal 110 through the authentication information transmitted from the terminal 110. To this end, the user may register the authentication information in the Web server 120 in advance. The registration of the authentication information can be performed in a similar manner to a subscription process to a Web site. However, it is understood that aspects of the present invention are not limited thereto.

When the terminal 110 can communicate with or access the Web server 120, the terminal 110 can transmit the generated contents to the Web server 120. The transmitting of the generated contents will now be described with reference to FIGS. 4 and 5.

Figure 4:
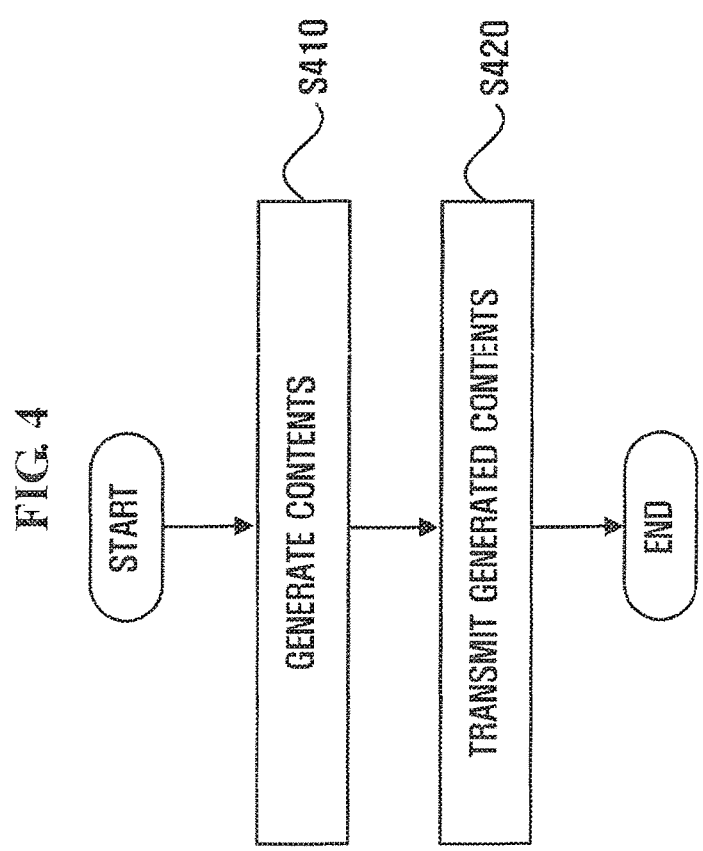
FIG. 4 is a flowchart showing a method in which a terminal transmits contents to a Web server according to an example embodiment of the present invention.
Figure 5:
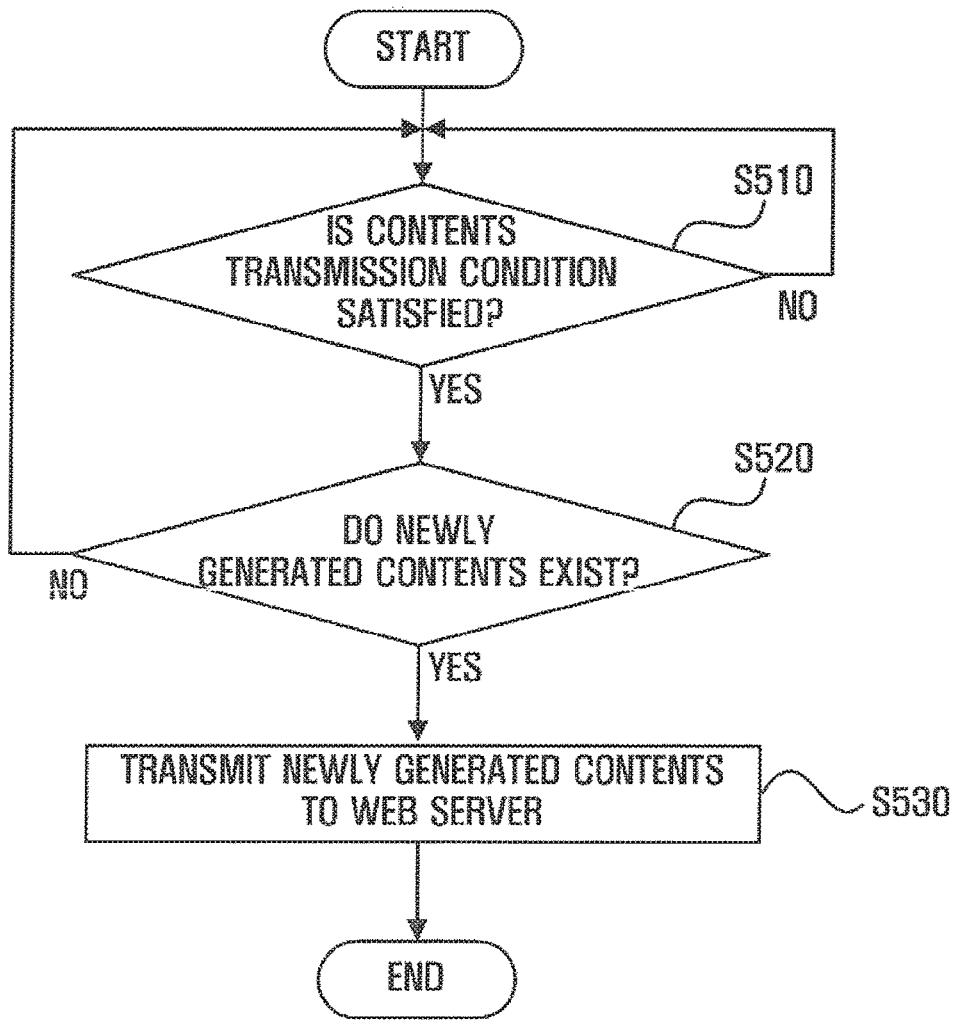
FIG. 5 is a flowchart showing a method in which a terminal transmits contents to a Web server according to another example embodiment of the present invention.

FIG. 4 is a flowchart showing a method in which a terminal 110 transmits contents to a Web server 120 according to an embodiment of the present invention. FIG. 5 is a flowchart showing a method in which a terminal 110 transmits contents to a Web server 120 according to another embodiment of the present invention Referring to FIGS. 2 and 4, the terminal 110 generates contents in operation S410. For example, when the terminal 110 includes an imaging element, the terminal 110 can generate photographs or motion pictures. Similarly, when the terminal 110 includes a short message editor, the terminal 110 can generate short messages. In addition, the terminal 110 that has a scheduling application (hereinafter, referred to as "scheduler") can generate a schedule of a user according to the user's input. Moreover, it is understood that the terminal 110 can generate other types of contents according to functions provided therein.

As such, the terminal 110 directly creates the contents using the functions provided therein to generate the contents. However, aspects of the present invention are not limited thereto. For example, according to other aspects of the present invention, the terminal 110 may generate the contents by receiving the contents from another apparatus or network and/or modifying the received contents, thereby creating new contents. Furthermore, according to another example, the terminal 110 may connect to a portable storage device (such as a multimedia card, an SD card, or a memory stick) and acquire contents stored in the portable storage device, wherein the acquired contents can be handled as the contents generated by the terminal 110. Alternatively, the terminal 110 can receive a short message from another terminal, and the received short message can be handled as the contents generated by the terminal 110.

After generating the contents (operation S410), the terminal 110 transmits the generated contents to the Web server 120 in operation S420.

According to the embodiment shown in FIG. 4, whenever new contents are generated, the terminal 110 transmits the generated contents to the Web server 120. That is, the generated contents are transmitted from the terminal 110 to the Web server 120 in real time. However, aspects of the present invention are not limited thereto. For example, when a predetermined condition is satisfied, the terminal 110 may transmit all the generated contents to the Web server 120 at one time. An example is shown in FIG. 5.

Referring to FIG. 5, although a method in which the terminal 110 generates the contents is omitted, it is understood that the terminal 110 generates the contents (as described above with reference to operation S410 in FIG. 4) and stores the generated contents. As a separate operation from the generation and storage of the contents, the terminal 110 determines whether a contents transmission condition is satisfied in operation S510. The contents transmission condition may be a default condition or may be set or changed by the user.

Information about whether it is a time to transmit the new contents generated by the terminal 110 to the Web server 120 is an example of the contents transmission condition. Specifically, if a time period from midnight to 3 a.m. is set for the contents transmission condition, the terminal 110 compares a current time with the time set for the contents transmission condition and then determines whether the contents transmission condition is satisfied.

A communication method that is to be used by the terminal 110 is another example of the contents transmission condition. In detail, when the terminal 110 is a portable digital apparatus, the position of the terminal 110 frequently changes. As the position of the terminal 110 changes, a communication method that is used by the terminal 110 to access the Web server 120 may also change (as described above with reference to FIG. 2). Accordingly, if a specified communication method is set for the contents transmission condition, whenever the communication method is changed, the terminal 110 compares the changed communication method with the communication method set for the contents transmission condition and then determines whether the contents transmission condition is satisfied.

It is understood that aspects of the present invention are not limited to the above-described examples of the contents transmission condition, and other contents transmission conditions may be used.

If the contents transmission condition is satisfied (operation S510), the terminal 110 determines whether newly generated contents exist in operation S520. Here, the newly generated contents are contents stored in the terminal 110 that have not already been transmitted to the Web server 120.

If the newly generated contents exist (operation S520), the terminal 110 transmits the corresponding contents to the Web server 120 in operation S530. For the contents transmission, the terminal 110 accesses the Web server 120 as described above, for example, with reference to FIG. 3. The Web server 120 reconstructs the contents transmitted from the terminal 110. The reconstructing of the contents will now be described with reference to FIG. 6.

Figure 6:
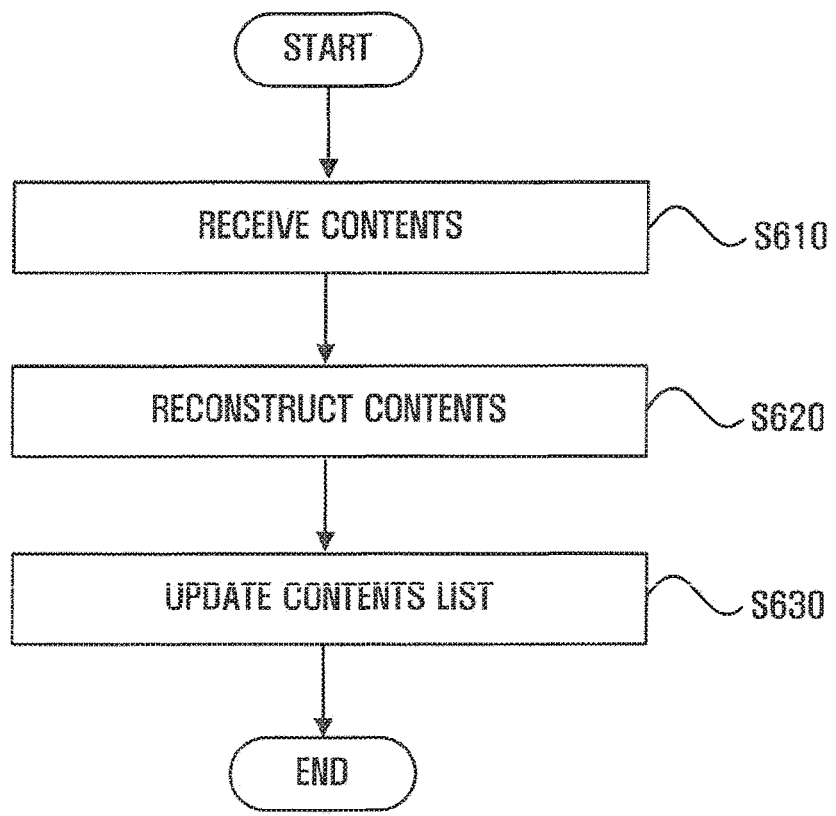
FIG. 6 is a flowchart showing a content management method of a Web server according to an example embodiment of the present invention.

FIG. 6 is a flowchart showing a content management method of a Web server 120 according to an embodiment of the present invention. Referring to FIGS. 2 and 6, the Web server 120 receives contents from the terminal 110 in operation S610. Then, the Web server 120 reconstructs the received contents according to attributes of the contents in operation S620. Here, the attributes are, for example, information explaining the contents or identifying categories relating to the contents. Examples of the attributes include the types of the contents (for example, music, motion picture, photograph, e-mail, memo, short message, or schedule), meta data in the contents, and contexts of the contents.

The meta data can be divided into common information common to all the contents and individual information specific to each of the contents. Examples of the common information include a contents generation position, a contents generation time, and a character related to the contents. Examples of the individual information include a genre, an artist, and an album where the contents are music, and a keyword, a writer, and a genre where the contents are electronic books. It is understood that other types of common information and individual information can exist.

The meta data can be added to the contents on the basis of information input by the user of the terminal 110. However, aspects of the present invention are not limited thereto. Alternatively, the meta data may be automatically added to the contents according to functions provided by the terminal 110. For example, the terminal 110 that can confirm the position using information regarding the GPS or base station can automatically add, to the contents, positional information when the contents are generated. Furthermore, the terminal 110 that cyclically receives current time information from the base station or a timer function can add time information at which the contents are generated to the contents as the meta data.

Meanwhile, in order to reconstruct the contents according to the contexts of the contents, the Web server 120 can include a function of analyzing the contents. A technical method of analyzing the contexts may vary according to the types of the contents. For example, when the contents are short messages or schedules, the Web server 120 extracts words from the short messages or the schedules, compares the extracted words with previously recorded words, and subsequently lists the contents in an appropriate category. If the contents are photographs, the Web server 120 extracts a face image from the photograph, analyzes a feature of the extracted face image, and subsequently determines whether a previously registered character exists in the photograph. If the previously registered character exists in the photograph, the Web server 120 can list the photograph in a category related to the corresponding character.

It is understood that aspects of the present invention are not limited to the above-described contents reconstruction methods. The contents reconstruction method may vary according to services that are provided by the Web server 120. Furthermore, the kinds of the attributes as the criterion of the contents reconstruction may also vary according to the embodiments.

The Web server 120 stores the reconstructed contents, and updates the contents list stored therein according to the reconstructed contents in operation S630.

Though not shown in FIG. 6, it is understood that the contents reconstruction or contents list update operation can be performed according to the user. That is, according to the authentication information or identification information transmitted from the terminal 110, the Web server 120 can update a contents list corresponding to the user, or store contents corresponding to the user transmitting the contents received in operation S610.

The contents reconstructed by the Web server 120 can be provided to the terminals 110, 130, and 140 (illustrated in FIG. 1) that require the contents. The transmitting of the contents from the Web server 120 to the terminals 110, 130, and 140 will now be described with reference to FIGS. 7 to 10.

FIG. 7 is a diagram showing a method in which a terminal 110 receives contents from a Web server 120 according to an embodiment of the present invention. Referring to FIG. 7, the terminal 110 first requests contents search information from the Web server 120 in operation S710. To request the contents search information (operation S710), the terminal 110 accesses the Web server 120 as described above, for example, with reference to FIG. 3. The contents search information is information used to construct a user interface for guiding the search of the contents, and can include the contents list updated in operation S630 of FIG. 6.

Upon receiving the request from the terminal 110, the Web server 120 transmits the contents search information stored therein to the terminal 110 in operation S720. The terminal 110 displays the contents search information transmitted from the Web server 120 in operation S730.

Figure 8A:
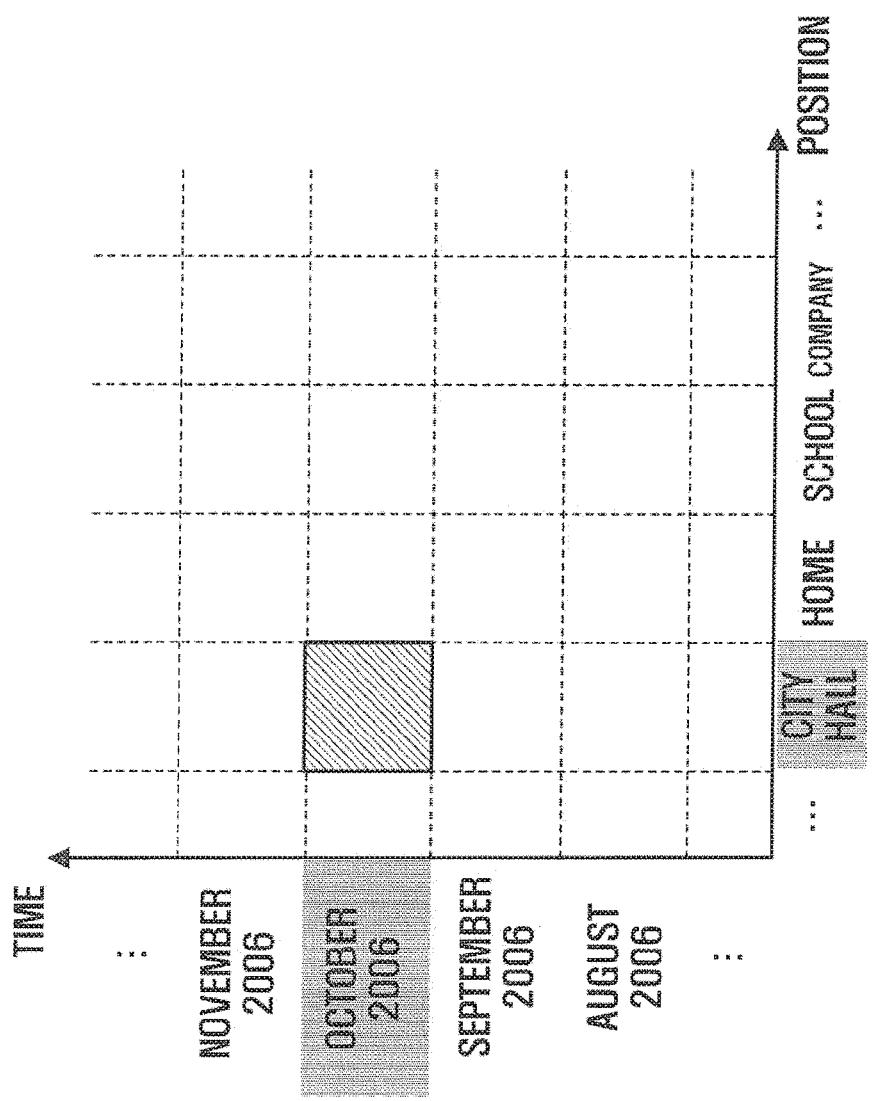
FIG. 8A is a diagram showing contents search information according to an example embodiment of the present invention.

The contents search information can be provided in a variety of ways according to a contents reconstruction criterion or reconstruction result. For example, the contents search information can include the contents list, arranged on the basis of at least one attribute. The contents search information shown in FIG. 8A is provided such that the contents are searched for on the basis of time and position attributes. That is, the user can search the contents according to the contents generation time and position using the contents search information.

In the contents search information, the search criterion can be modified (for example, an attribute can be added or changed). For example, referring to FIG. 8A, if a request to add a character attribute is input from the user, the terminal 110 can transmit a request to the Web server 120 to add the character attribute. According to the request of the terminal 110, the Web server 120 can transmit the contents search information including the character attribute to the terminal 110. Then, as shown in FIG. 8B, the terminal 110 can display the contents search information including the character attribute. However, it is understood that according to other aspects of the present invention, the terminal 110 does not need to request the Web server 120 to add or change the attribute as the search criterion, and the contents search information transmitted from the Web server 120 in operation S720 may be constructed such that the attribute as the search criterion can be changed or added solely within the terminal 110.

Figure 9:
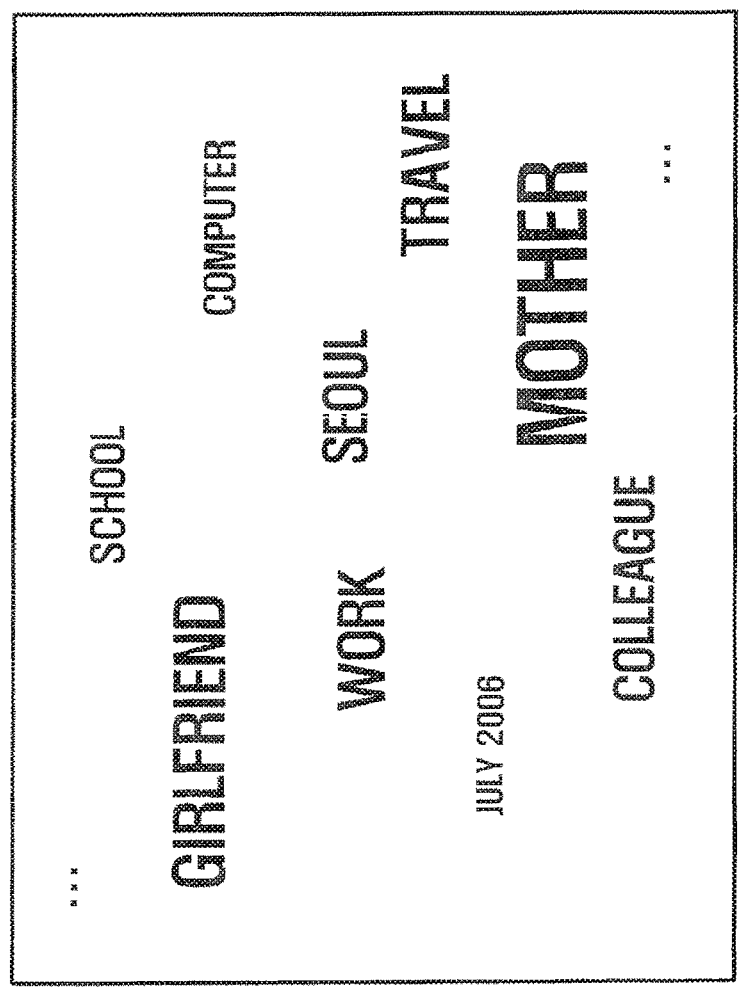
FIG. 9 is a diagram showing contents search information according to another example embodiment of the present invention.

FIG. 9 is a diagram showing contents search information according to another embodiment of the present invention. In the contents search information shown in FIG. 9, the attribute of the contents is represented by a text. The size of the text represents an importance of each attribute. For example, the larger that the size of the text is, the more the number of contents related to the corresponding attribute is. It is understood that aspects of the present invention are not limited to a size representation of the importance of each attribute. For example, the importance of each attribute may be represented by the color of the text. Furthermore, instead of or in addition to the text, an icon may be used.

The structures of the contents search information shown in FIGS. 8A through 9 are just examples of the present invention, and are not intended to limit aspects of the present invention. The user can search and select desired contents through the contents search information to be displayed on the terminal 110.

Returning to FIG. 7, if the user selects specified contents from the displayed contents search information, the terminal 110 requests the selected contents from the Web server 120 in operation S740. The Web server 120 transmits the requested contents to the terminal 110 in operation S750. The Web server 120 may transmit the requested contents in operation S750 according to a download method or a streaming method, depending for example on the type of the contents or setting.

Although FIG. 7 shows the operation between the terminal 110 that transmitted the contents to the Web server 120 (as shown in FIGS. 4 and 5) and the Web server 120, the same operation can be performed between another terminal 130 (illustrated in FIG. 1) of the same user or the terminal 140 (illustrated in FIG. 1) of another user and the Web server 120. For example, the user of the terminal 110 can register authentication information of another user in the Web server 120 in advance such that the contents transmitted from the terminal 110 to the Web server 120 and managed by the Web server 120 can be provided to the terminal 130 of another user.

Figure 10:
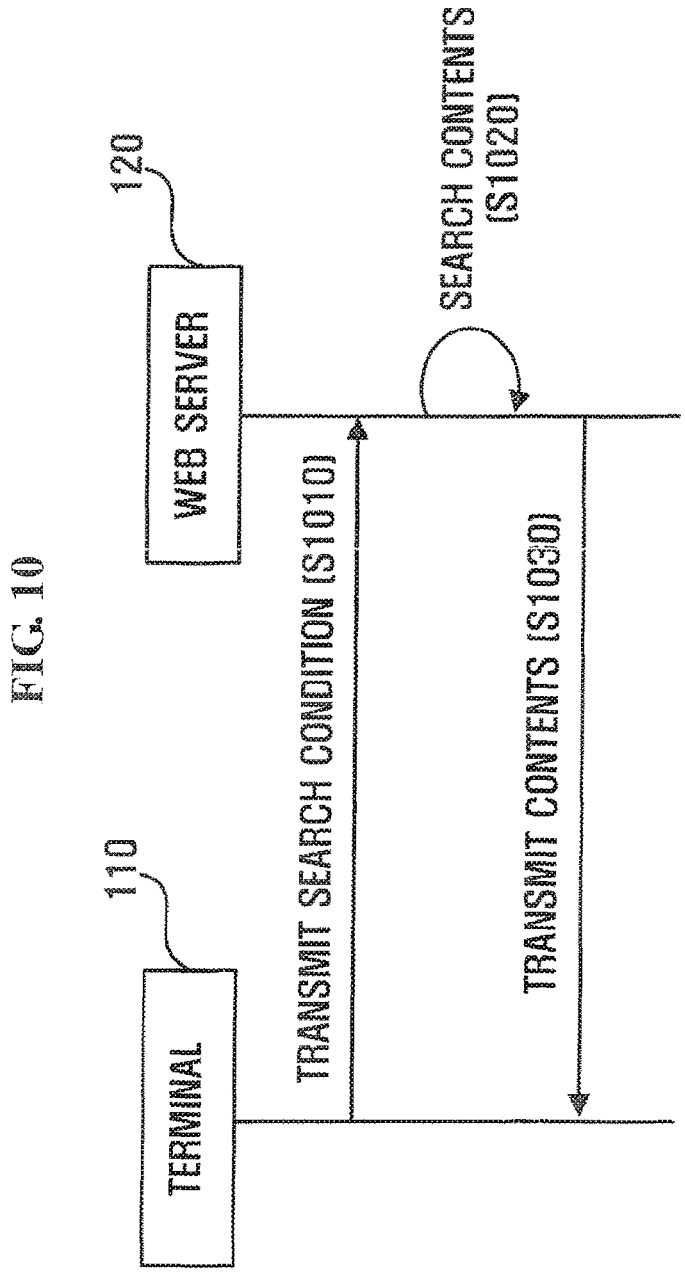
FIG. 10 is a diagram showing a method in which a terminal receives contents from a Web server according to an example embodiment of the present invention.

FIG. 10 is a diagram showing a method in which a terminal 110 receives contents from a Web server 120 according to an embodiment of the present invention. Referring to FIG. 10, the terminal 110 transmits a search condition to the Web server 120 in operation S1010. The search condition can include one or more keywords for defining the attribute of the contents. According to an aspect of the present invention, the search condition can be transmitted to the Web server 120 together with the request to transmit the contents.

The Web server 120 searches contents corresponding to the transmitted search condition transmitted in operation S1020. For example, if a search condition including a keyword "company" is transmitted, the Web server 120 can search contents related to a company. Since the contents stored in the Web server 120 are classified according to the attributes, the contents corresponding to the search condition can be easily searched even though there are a large number of contents to be managed by the Web server 120. Here, among the contents stored in the Web server 120, the contents of the user that uses the terminal 110 or the contents of other users who belong to the same community as the user of the terminal 110 may be included within a search range.

If the contents corresponding to the search condition are found (operation S1020), the Web server 120 transmits the found contents to the terminal 110 in operation S1030.

Although FIG. 10 shows a case where the Web server 120 immediately transmits the contents found by the search operation to the terminal 110, aspects of the present invention are not limited thereto. The Web server 120 may transmit a list of the contents found in operation S1020 to the terminal 110. In this case, the terminal 110 can display the contents list. If the user selects specific contents from the contents list, the terminal 110 can request the selected contents from the Web server 120. Thereafter, the Web server 120 can transmit the contents requested by the terminal 110 to the terminal 110.

According to an aspect of the present invention, the Web server 120 can automatically transmit the contents transmitted from the terminal 110 to another terminal 130 of the user that uses the terminal 110. For example, the Web server 120 can transmit e-mails, schedules, and memos to a PDA, transmit music to an MP3 player, and transmit photographs and motion pictures to a PMP or a digital TV.

Furthermore, the user can set contents to be transmitted and a terminal to which the contents are transmitted. Accordingly, the user can register, in the Web server 120, an identifier (for example, a MAC address) of the terminal 130 and the types of the contents to be transmitted to the terminal 130. The Web server 120 can transmit the contents to the corresponding terminal 130 with reference to the information.

In order to allow the Web server 120 to automatically transmit the contents to the terminal 130 even though the terminal 130 does not request the contents, the terminal 130 must be connected to a network, such as the Internet, though which the terminal 130 can connect to the Web server 120. When the terminal 130 is a fixed digital apparatus (such as a digital TV, a set-top box, or a desktop computer), the terminal 130 can constantly be connected to the network. Meanwhile, when the terminal 130 is a portable digital apparatus (such as an MP3 player, a cellular phone, a PDA, and a PMP), the terminal 130 can be irregularly connected to the network.

If the terminal 130 is connected to the network, the Web server 120 may immediately transmit the contents received from the terminal 110 to the terminal 130. Meanwhile, if the terminal 130 is not connected to the network, the Web server 120 may stop and/or postpone the transmission of the contents to the terminal 130. Then, when the terminal 130 is connected to the network, the Web server 120 may begin to transmit the contents received from the terminal 110 to the terminal 130.

In order to allow the Web server 120 to automatically transmit the contents to the terminal 130, the address of the terminal 130 on the network (for example, an IP address) is needed. To this end, when connected to the network, the terminal 130 can transmit, to the Web server 120, information that the terminal 130 is connected to the network. This information can include a network address allocated to the terminal 130 (for example, an IP address). Accordingly, the Web server 120 can automatically transmit the required contents to the terminal 130.

Figure 11:
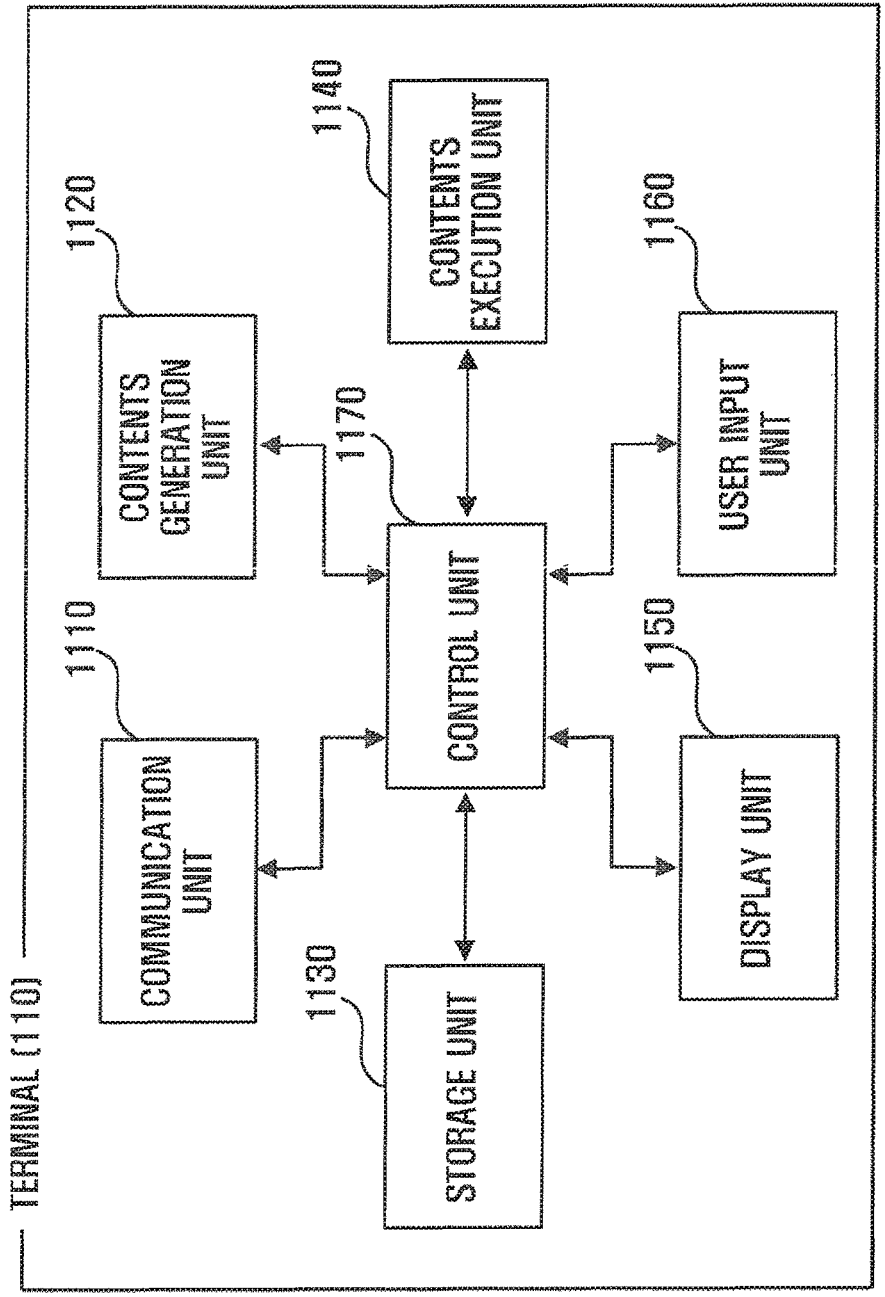
FIG. 11 is a block diagram showing a configuration of a terminal according to an example embodiment of the present invention.

FIG. 11 is a block diagram showing a configuration of a terminal 110 illustrated in FIG. 1 according to an embodiment of the present invention. It is understood that other terminals 130 and 140 illustrated in FIG. 1 can have the same configuration as that of the terminal 110.

Referring to FIG. 11, the terminal 110 includes a communication unit 1110, a contents generation unit 1120, a storage unit 1130, a contents execution unit 1140, a display unit 1150, a user input unit 1160, and a control unit 1170.

The communication unit 1110 transmits contents, data, and information to the Web server 120, and receives contents, data, and information from the Web server 120. To access the Web server 120, the communication unit 1110 can transmit authentication information (for example, a user ID and password or MAC address of the terminal 110) to the Web server 120. When the user inputs or requests that the authentication information be transmitted, the communication unit 1110 transmits the authentication information to the Web server 120. However, according to other aspects of the present invention, the communication unit 1110 can transmit the authentication information to the Web server 120 without a user request.

The communication unit 1110 does not necessarily directly communicate with the Web server 120. As described above with reference to FIG. 2, the terminal 110 may be connected to a network (for example, the Internet 210) to which the Web server 120 belongs through a connection with the service providers 224, 234, and 244. Here, the terminal 110 can use a communication method that supports a connection with the network service providers 223, 234, and 244. The communication unit 1110 communicates based on the communication method. Although the communication unit 1110 is shown as a single block in FIG. 11, the communication unit 1110 can include a plurality of sub-communication units (not shown) that support individual communication methods when the communication unit 1110 is implemented to use a plurality of communication methods. For example, the communication unit 1110 can include a WiFi communication unit, a CDMA communication unit, and/or a WiBro communication unit, although not limited thereto. The kinds of the communication methods for the communication unit 1110 or the number of communication methods to be supported by the communication unit 1110 can be set in various ways according to aspects of the present invention.

The contents generation unit 1120 generates the contents according to a user's request. Although the contents generation unit 1120 is shown as a single block in FIG. 11, when the contents generation unit 1120 is implemented to generate various kinds of contents, the contents generation unit 1120 can include a plurality of sub-contents generation units (not shown). For example, the contents generation unit 1120 can include an imaging element and an encoder that generate photographs or motion pictures, a message editor that generates short messages, and a scheduler that generates schedules, although not limited thereto.

The storage unit 1130 stores the contents generated by the contents generation unit 1120 and contents, data, and information received from the Web server 120 through the communication unit 1110. To this end, the storage unit 1130 can include a memory, such as a flash memory, a hard disk, a ROM, or a RAM.

The contents execution unit 1140 executes the contents stored in the storage unit 1130. Here, the contents stored in the storage unit 1130 may be the contents generated by the contents generation unit 1120 or the contents received from the Web server 120. Moreover, if the contents are executed, the user can use the contents. In order to execute different types of contents, the contents execution unit 1140 can include at least one sub-contents execution unit (not shown). For example, the contents execution unit 1140 can include a text viewer that outputs memos or schedules, and a media player that plays motion pictures or music, although not limited thereto.

The display unit 1150 displays the contents to be executed by the contents execution unit 1140 or displays a user interface, such as the contents search information, transmitted from the Web server 120 or generated by the terminal 110 based on the contents search information.

The user input unit 1160 receives user inputs. That is, the user can request to execute the contents, request to generate the contents, or request the Web server 120 to search the contents through the user input unit 1160, although not limited thereto. To this end, the user input unit 1160 can manipulation devices, including buttons, a touch pad, a touch screen, or a jog switch.

The control unit 1170 performs the operations to select a communication method to be used by the communication unit 1110 (operations S310, S320, S340, and S350 illustrated in FIG. 3) or the operations to determine whether to transmit the contents to the Web server 120 through the communication unit 1110 (operations S510 and S520 in FIG. 5). Furthermore, the control unit 1170 can generate a request message to request the contents search information from the Web server 120 or to transmit the contents search condition. In addition, the control unit 1170 can control the operations of the individual components of the terminal 110 so that the terminal 110 can appropriately perform the required operations, as described above with reference to FIGS. 1 through 10.

FIG. 12 is a block diagram showing a configuration of a Web server 120 according to an embodiment of the present invention. The Web server 120 includes a network connection unit 1210, an authentication unit 1220, a contents reconstruction unit 1230, a storage unit 1240, a contents list management unit 1250, and a control unit 1260.

The network connection unit 1210 receives contents, data, and information from the terminal 110, and transmits contents, data, and information to the terminal 110. It is understood that the network connection unit 1210 does not necessarily directly communicate with the terminal 110. As described above with reference to FIG. 2, the network connection unit 1210 can communicate with the terminal 110 through network service providers 224, 234, and 244.

The authentication unit 1220 identifies and authenticates the user of the terminal 110 using authentication information (for example, the user ID and password or the MAC address of the terminal 110) transmitted from the terminal 110. Further, the authentication unit 1220 may manage authentication information of other users belonging to the same community as the user of the terminal 110, together with the authentication information of the user of the terminal 110. Furthermore, the authentication unit 1220 can manage identification information of another terminal 130 of the user who uses the terminal 110 and the types of the contents to be automatically transmitted to the other terminal 130.

The contents reconstruction unit 1230 reconstructs the contents received from the terminal 110. For example, when the contents are music files, the contents reconstruction unit 1230 can classify the music files on the basis of the genre, the artist, and the album with reference to meta data in the music file. When the contents are electronic books, the contents reconstruction unit 1230 can classify the electronic books according to the keyword, the writer, and the genre by referring to meta data in the electronic books or by analyzing the context of the electronic books. When the contents are schedule files, the contents reconstruction unit 1230 can classify the schedule files according to title, date, and content. When the contents are e-mails, the contents reconstruction unit 1230 can classify the e-mail according to transmission time, title, importance, and attachments. These contents reconstruction methods are just examples of the present invention, and are not intended to limit aspects of the present invention. Accordingly, the contents reconstruction unit 1230 can analyze various attributes of the contents and reconstruct (or reorganize) the contents according to the attributes of the contents, as described above, for example, with reference to FIG. 6.

The storage unit 1240 stores the contents received from the terminal 110. The storage unit 1240 may store the contents in a storage area that is allocated to a user authenticated by the authentication unit 1220 (a user of a terminal from which the contents are transmitted). The storage area may be logically or physically separated from storage areas allocated to other users.

The contents list management unit 1250 manages a contents list including information regarding the contents stored in the storage unit 1240. If the storage unit 1240 stores new contents, the contents list management unit 1250 updates the contents list to include information regarding the newly stored contents. The information regarding the contents in the contents list can be acquired from the contents reconstruction unit 1230. It is understood that the contents list managed by the contents list management unit 1250 may be divided such that there exists a plurality of contents lists, each corresponding to a user. Furthermore, the contents list management unit 1250 can manage the contents search information that is used to provide a user interface in the terminal 110 to search the contents. The contents search information includes the contents list. When transmitted to the terminal 110, the contents search information can be displayed as a user interface.

The control unit 1260 searches the contents stored in the storage unit 1240 and analyzes request messages transmitted by the terminal 110. Moreover, the control unit 1260 can identify a terminal to which the contents or the contents search information are transmitted through information managed by the authentication unit 1220. In addition, the control unit 1260 can control the operations of the individual components of the Web server 120 such that the Web server 120 can appropriately perform the required operations described above with reference to FIGS. 1 through 10.

The operations of the components of each of the terminal 110 and the Web server 120 that have been described with reference to FIGS. 11 and 12 will be apparently understood from the descriptions of FIGS. 1 through 10.

The components of each of the terminal 110 and the Web server 120 that have been described with reference to FIGS. 11 and 12 can be implemented by modules. The term "unit," as used herein, refers to, but is not limited to, a software or hardware component, such as a Field Programmable Gate Array (FPGA) or Application Specific Integrated Circuit (ASIC), that performs certain tasks. A unit may advantageously be configured to reside on the addressable storage medium and configured to execute on one or more processors. Thus, a unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and units may be combined into fewer components and units or further separated into additional components and units. In addition, the components and units may be implemented such that they are executed on one or more computers in a communication system. If the module is implemented by only software, each of the terminal 110 and the Web server 120 may further include a processor that can execute software.

Aspects of the present invention can also be embodied as computer-readable codes on a computer-readable recording medium. Also, codes and code segments to accomplish the present invention can be easily construed by programmers skilled in the art to which the present invention pertains. The computer-readable recording medium is any data storage device that can store data which can be thereafter read by a computer system or computer code processing apparatus. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Aspects of the present invention may also be realized as a data signal embodied in a carrier wave and comprising a program readable by a computer and transmittable over the internet.

According to the contents management method and apparatus of aspects of the present invention, the following effects can be obtained. First, the contents can be more efficiently managed. Second, a user can more conveniently use the contents.

Although a few embodiments of the present invention have been shown and described, it would be appreciated by those skilled in the art that changes may be made in this embodiment without departing from the principles and spirit of the invention, the scope of which is defined in the claims and their equivalents.

The invention claimed is:

1. A method comprising:
   determining, at an electronic device of a user, whether content has been updated or generated;
   in response to determination that the content has been updated or generated, automatically transmitting the updated or generated content from the electronic device to a server if the electronic device is connected to the server using a Wi-Fi network; and
   in a case during the automatic transmission of the updated or generated content to the server via the Wi-Fi network where the electronic device is connected to the Wi-Fi network and connected to at least one other network using a different radio access technology (RAT), refraining from transmitting a remaining portion of the updated or generated content to the server via the at least one other network upon disconnection from the Wi-Fi network, wherein the determination to automatically transmit the updated or generated content and the determination to refrain based on a RAT type from transmitting the remaining portion of the updated or generated content while connected to the server via the at least one other network are made solely by the electronic device, and wherein the updated or generated content is automatically transferred to another electronic device of the user by the server.

2. The method of claim 1, further comprising receiving, while the electronic device is connected to the Wi-Fi network, content of the other electronic device from the server.

3. The method of claim 2, wherein the electronic device receives the content of the other electronic device from the server based on an association of the electronic device and the other electronic device with the user.

4. The method of claim 1, further comprising inputting a setting for causing the transmitting of the updated or generated content prior to a time of transmission.

5. The method of claim 1, wherein the content comprises at least one of a photograph, music, a video, an e-mail, an electronic book, a schedule, a message, or a memo.

6. The method of claim 1, wherein the updated or generated content is stored in a storage area allocated to the user available on the server.

7. An electronic device comprising:
a first communication interface configured to establish a communication connection with a cellular network;
a second communication interface configured to establish a communication connection with a Wi-Fi network; and
at least one processor configured to:
determine whether content has been updated or generated on the electronic device,
in response to determination that the content has been updated or generated, control the second communication interface to automatically transmit to a server the updated or generated content if the electronic device is connected to the server using the Wi-Fi network, and
in a case during the automatic transmission of the updated or generated content to the server via the Wi-Fi network where the electronic device is connected to the Wi-Fi network and connected to at least one other network using a different radio access technology (RAT), refrain from transmitting a remaining portion of the updated or generated content to the server using the first communication interface via the at least one other network upon disconnection from the Wi-Fi network,
wherein the determination to automatically transmit the updated or generated content and the determination to refrain based on a RAT type from transmitting the remaining portion of the updated or generated content while connected to the server via the at least one other network are made solely by the electronic device, and
wherein the updated or generated content is automatically transferred to another electronic device of a user by the server.

8. The electronic device of claim 7, wherein the at least one processor is further configured to receive, while the electronic device is connected to the Wi-Fi network, content of the other electronic device from the server using the second communication interface.

9. The electronic device of claim 8, wherein the electronic device receives the content of the other electronic device from the server based on an association of the electronic device and the other electronic device with the user.

10. The electronic device of claim 7, wherein the at least one processor is further configured to receive input of a setting for the transmitting of the updated or generated content prior to a time of transmission.

11. The electronic device of claim 7, wherein the content comprises at least one of a photograph, music, a video, an e-mail, an electronic book, a schedule, a message, or a memo.

12. The electronic device of claim 7, wherein the at least one processor is further configured to control the second communication interface to store the updated or generated content in a storage area allocated to the user available on the server.

13. An electronic device comprising:
a first communication interface configured to establish a communication connection with a cellular network;
a second communication interface configured to establish a communication connection with a Wi-Fi network; and
at least one processor configured to:
determine whether a network to which the electronic device is connected is the Wi-Fi network among a plurality of networks, each network of the plurality of networks using a different radio access technology (RAT),
in response to determination that the network is the Wi-Fi network, determine whether any content has been updated or generated since a last transmission,
in response to determination that the content has been updated or generated, control the second communication interface to automatically transmit to a server, the updated or generated content, and
in a case during the automatic transmission of the updated or generated content to the server via the Wi-Fi network where the electronic device is connected to the Wi-Fi network and connected to at least one other network using a different RAT, refrain from transmitting a remaining portion of the updated or generated content to the server using the first communication interface,
wherein the at least one processor is further configured to control the second communication interface to transmit to the server the updated or generated content that occurs automatically without a user input,
wherein the determination to automatically transmit the updated or generated content and the determination to refrain based on a RAT type from transmitting the remaining portion of the updated or generated content while connected to the server via the at least one other network are made solely by the electronic device, and
wherein the updated or generated content is automatically transferred to another electronic device of a user by the server.

14. The electronic device of claim 13, wherein the at least one processor is further configured to receive, while the electronic device is connected to the Wi-Fi network, content of the other electronic device from the server using the second communication interface.

15. The electronic device of claim 14, wherein the electronic device receives the content of the other electronic device from the server based on an association of the electronic device and the other electronic device with the user.

16. The electronic device of claim 13, wherein the content comprises at least one of a photograph, music, a video, an e-mail, an electronic book, a schedule, a message, or a memo.

* * * * *